US007383315B2

(12) United States Patent
Pierce et al.

(10) Patent No.: US 7,383,315 B2
(45) Date of Patent: Jun. 3, 2008

(54) SYSTEM AND METHOD FOR A DELTA PAGE PROTOCOL FOR CACHING, REPLICATION, AND CLIENT/SERVER NETWORKING

(75) Inventors: David Mark Pierce, Austin, TX (US); Dudley Wayne Fox, Jr., Austin, TX (US)

(73) Assignee: National Instruments Corporation, Austin, TX (US)

( * ) Notice: Subject to any disclaimer, the term of this patent is extended or adjusted under 35 U.S.C. 154(b) by 1062 days.

(21) Appl. No.: 09/920,893

(22) Filed: Aug. 2, 2001

(65) Prior Publication Data

US 2003/0055605 A1    Mar. 20, 2003

(51) Int. Cl.
G06F 15/16 (2006.01)
G06F 15/173 (2006.01)
G06F 15/00 (2006.01)
G06F 11/00 (2006.01)

(52) U.S. Cl. ............... 709/217; 709/224; 702/187; 702/188

(58) Field of Classification Search ............ 709/214, 709/215, 216; 702/187, 179, 182, 188; 707/2, 707/3, 20.1, 204
See application file for complete search history.

(56) References Cited

U.S. PATENT DOCUMENTS

| 4,602,341 | A | * | 7/1986 | Gordon et al. ............ 700/286 |
| 4,815,030 | A | * | 3/1989 | Cross et al. ............... 707/10 |
| 4,897,782 | A | * | 1/1990 | Bennett et al. ............ 707/10 |
| 5,404,488 | A | * | 4/1995 | Kerrigan et al. ........... 711/133 |
| 5,626,144 | A | * | 5/1997 | Tacklind et al. ........... 600/538 |
| 5,682,328 | A | * | 10/1997 | Roeber et al. ............. 702/187 |
| 5,918,229 | A |   | 6/1999 | Davis et al. |
| 5,918,232 | A | * | 6/1999 | Pouschine et al. ...... 707/103 R |
| 6,381,501 | B1 | * | 4/2002 | Takase ..................... 700/2 |
| 6,651,030 | B2 | * | 11/2003 | Victor et al. ............. 702/172 |
| 6,684,207 | B1 | * | 1/2004 | Greenfield et al. .......... 707/3 |
| 6,802,067 | B1 | * | 10/2004 | Camp et al. .............. 719/315 |
| 6,898,591 | B1 | * | 5/2005 | Moon et al. ................ 707/3 |
| 7,051,121 | B2 | * | 5/2006 | Ohno et al. ................ 710/5 |
| 7,228,256 | B2 | * | 6/2007 | Lin ........................ 702/188 |

* cited by examiner

*Primary Examiner*—Glenton B. Burgess
*Assistant Examiner*—Kevin Bates
(74) *Attorney, Agent, or Firm*—Meyertons Hood Kivlin Kowert & Goetzel, P.C.; Jeffrey C. Hood

(57) ABSTRACT

A method and system for a delta page protocol for caching, replication, and client/server networking. Measurement data may be received by a logger application on a first computer, and written to shared memory sections in a modular fashion, including creating one or more header records to indicate a changed status. Each shared memory section may be independently accessible by a trender application executing in a second computer. In response to a query from the trender, the first computer may send a single message, a delta page. The header record may be used to determine the changed status of data sections. A single write operation may store the data values in a memory of the second computer. The trender may then read the first plurality of data values. The trender may present the retrieved data or requested data on a display. The logging and trending may be performed substantially concurrently.

9 Claims, 6 Drawing Sheets

SYSTEM AND METHOD FOR A DELTA PAGE PROTOCOL FOR CACHING, REPLICATION, AND CLIENT/SERVER NETWORKING

BACKGROUND OF THE INVENTION

1. Field of the Invention

The present invention relates to computer software, and more particularly to a protocol for storing, replicating, and retrieving data over a network.

2. Description of the Related Art

Various measurement devices may provide different measurement streams (e.g., value-time pairs, data acquisition (DAQ) data). Typically, separate software application programs are required to process different types of measurement data (e.g., different measurement streams). Conventional database configuration typically implies that certain characteristics (e.g., persistence (storage on disk), caching, replication, networking, security) are dependent upon the type of data stored in the database. It is desirable to have robust software application programs that are able to process multiple types of measurement data using a shared code base. Benefits of a shared code base may include a smaller footprint (i.e., code size) and ease of maintenance.

Database replication may be a time consuming process, especially in the case of large amounts of data being replicated. For example, consider a logger application program on a first computer system writing a series of readings (e.g., time-value pairs) from one or more measurement devices to a local database. Current implementations of trender application programs on a second computer system, connected to the first computer system over a network, require that each reading or transaction be processed individually. As the number of transactions increases, the time necessary to complete the database replication increases. Thus, a larger and larger time delay is experienced by a user, as the amount of data or transactions increases.

For the foregoing reasons, there is a need for a system and method for a faster protocol for storing, replicating, and retrieving data over a network.

SUMMARY OF THE INVENTION

The present invention provides various embodiments of a system, method, and medium for a delta page protocol for caching, replication, and client/server networking.

Measurement data may be received or logged by a logger application. The logger application may execute on a first computer system. The received data may be live data acquired from a data acquisition device. The format of the received data may vary (e.g., waveform data, single-point data, alarm data, event data). The received data may be measurement data acquired from a measurement device. The received data may also be a stream of data comprising a first plurality of entries or data values. The received data may be received for a user specified time interval.

The logger application may store or write the received data or portions of the received data in respective shared memory sections of a memory in the first computer system in a modular fashion at a first data rate or during a first time period. Typically, the shared memory sections are stored in a volatile memory. Storing the received data in a modular fashion may include creating a header record comprising a series of bits, wherein the bits in the header record indicate a changed status of the respective shared memory sections. The logger application may then store or write the header record in the shared memory.

The logger application may store or write second and subsequent pluralities of received data values to second and subsequent shared memory sections in the first computer system during second and subsequent time periods. The first, second and subsequent pluralities of data values may affect only what is written to their respective first, second and subsequent shared memory sections.

Each of the portions of the plurality of data values in each of the respective shared memory sections may be independently accessible by a trender application executing in a second computer system. A single network message may be used to transmit multiple shared memory sections. Also, each of the portions of the plurality of data values in each of the respective shared memory sections may independently and accurately represent a subset of the measurement stream.

A trender application may generate a query for the plurality of data values or for a first portion or subset of the plurality of data values at a second data rate. The second data rate may be less than the first data rate. The generated query may be sent to the first computer system.

In response to the generated query, the first computer system may send a single message to the second computer system. The single message may be a single network message. The single message may include the plurality of data values or the first portion of the plurality of data values, depending upon the details of the query request. The single message may be referred to as a delta page. The trender application may receive the single message comprising the first portion of the plurality of data values. The trender application may be operable to partially replicate the plurality of data values comprising the measurement stream.

The sending of the single message may include a first observer software program executing on the first computer system querying the memory for a portion, such as a most recent portion, of data at the second data rate, and the first observer software program sending the portion of data to the second computer system at the second data rate after said querying the memory. The first observer software program may retrieve at least a subset of the measurement data and the header record from the shared memory location. The first observer software program may use the bits in the header record to determine the changed status of data sections in the measurement data. In one embodiment where multiple header records exist, retrieved measurement data may be associated with a single header record, or with multiple header records.

The receiving of the single message by the trender application may include a second observer software program on the second computer system receiving a portion, such as the most recent portion, of data at the second data rate from the first observer software program, and the second observer software program writing the portion of data to a memory location. In one embodiment, the memory location may be a database. The second observer software program may perform a single write operation to store the data values in a memory of the second computer system. The single write operation may update a local cache in a memory of the second computer system. After the single write operation, the trender application may read the first plurality of data values from the memory of the second computer system.

The trender application may present the retrieved data or requested data on a display. The retrieved data may include the first portion of the plurality of data values. The rate at which the retrieved data is displayed may be user configurable. In one embodiment, the logging and trending may be performed substantially concurrently.

In one embodiment, first measurement data of a first data type of a plurality of data types may be received from a first measurement device of a plurality of measurement devices. Additionally, second and subsequent measurement data of second and subsequent data types of a plurality of data types may be received from second and subsequent measurement devices of a plurality of measurement devices. There may be data types in common among the first, second, and subsequent measurement data. Similarly, there may be measurement devices in common among the first, second, and subsequent measurement devices. A second header record may be created when the first header record reaches a user specified number of bits, and subsequent header records may be created when a previous header record reaches the user specified number of bits.

BRIEF DESCRIPTION OF THE DRAWINGS

A better understanding of the present invention can be obtained when the following detailed description of several embodiments is considered in conjunction with the following drawings, in which.

Figure 1:
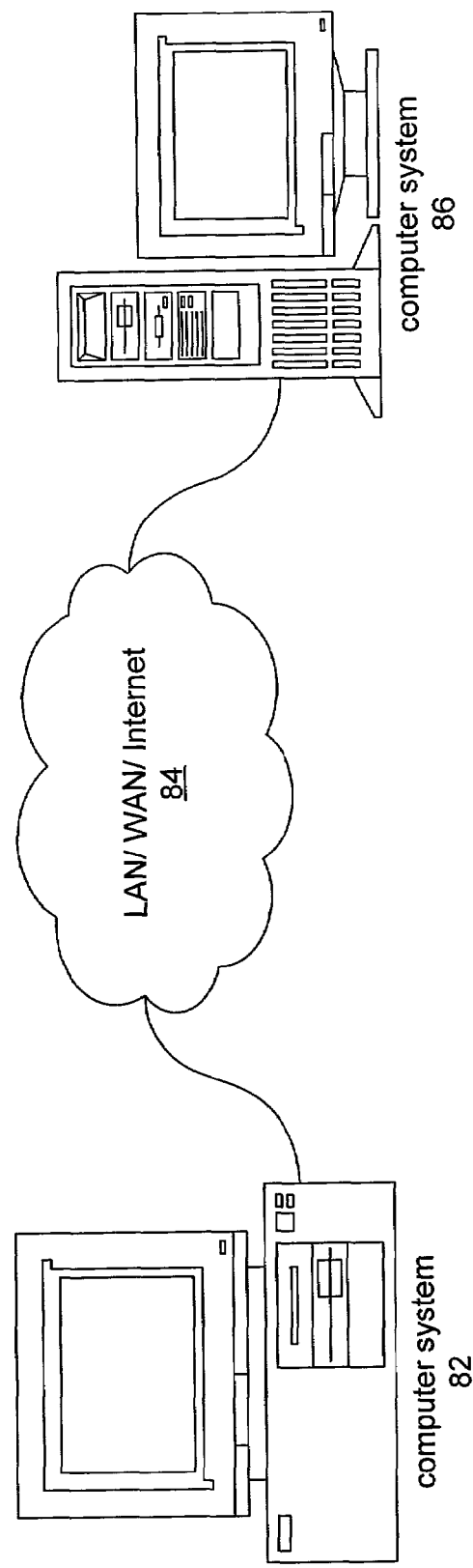
FIG. 1 illustrates a computer system connected through a network to a second computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF SEVERAL EMBODIMENTS

FIG. 1: Computer System Connected to a Network

FIG. 1 illustrates an exemplary computer network in which a computer system 82 is connected through a network 84 to a second computer system 86. The computer system 82 and the second computer system 86 can be any of various types, as desired. The network 84 can also be any of various types, including a LAN (local area network), a WAN (wide area network), or the Internet, among others.

The computer system 82 includes or stores a first client computer program operable to store data according to a delta page protocol for caching, replication, and client/server networking, and a second client computer program operable to retrieve data according to a delta page protocol for caching, replication, and client/server networking. In one embodiment, the data may be of various types, as described below. The data may reside in a database on the computer system 82 or on the second computer system 86.

The first client computer program and the second client computer program may be implemented in any of various ways, including procedure-based techniques, component-based techniques, and/or object-oriented techniques, among others. The programs may be written using any combination of text-based or graphical programming languages. Also, the programs may be written using distributed modules or components so that so that the first client computer program, the second client computer program, and the database may reside on any combination of computer system 82, computer system 86, and other computer systems connected to the network 84.

Figure 2A:
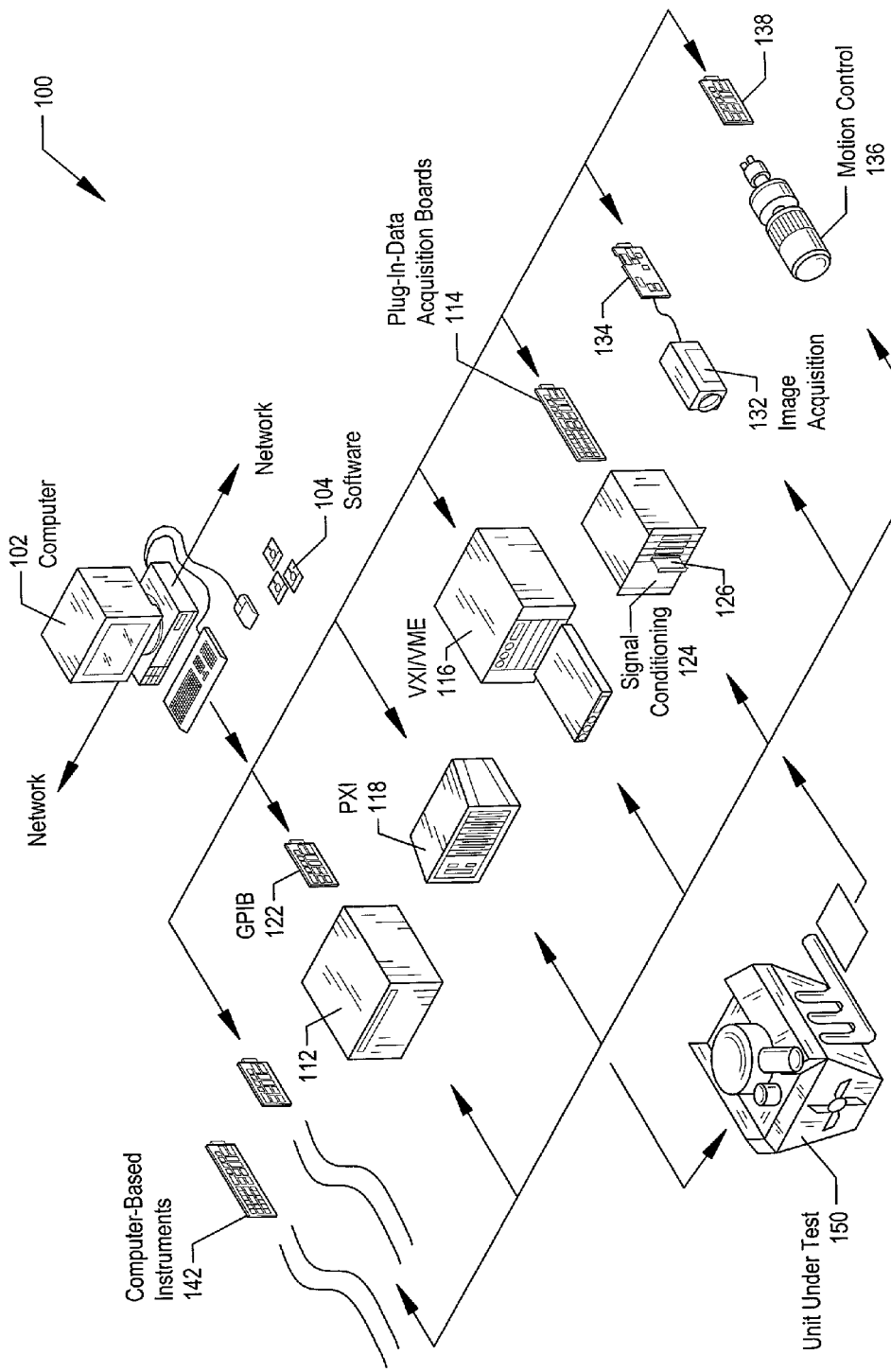
FIGS. 2A and 2B illustrate representative instrumentation and industrial automation systems including various I/O interface options.
Figure 2B:
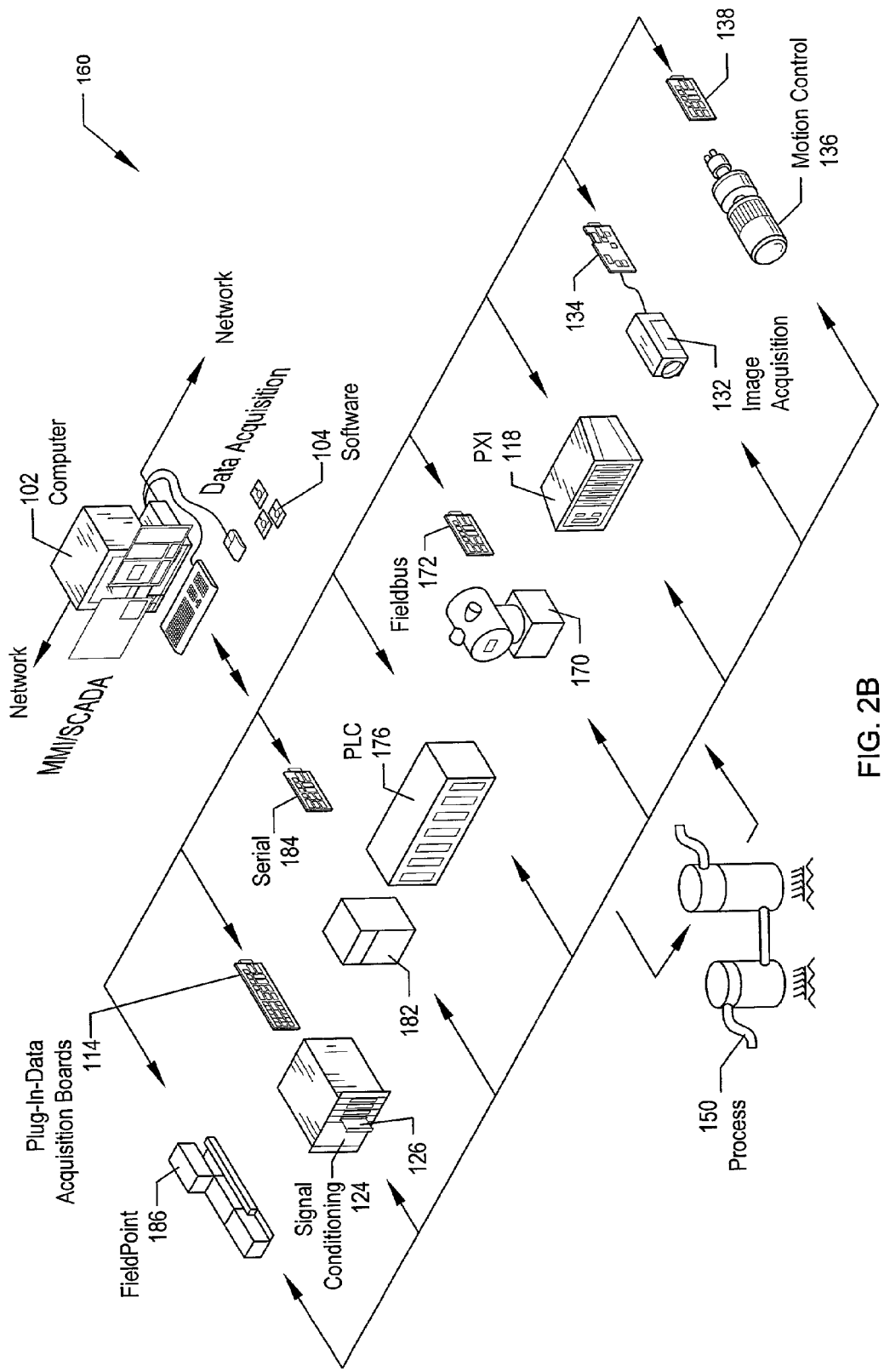

FIGS. 2A and 2B: Instrumentation and Industrial Automation Systems

FIGS. 2A and 2B illustrate exemplary systems which may store or use the first client computer program and the second client computer program. These programs may of course be stored in or used by other types of systems as desired.

FIG. 2A illustrates an instrumentation control system 100. The system 100 comprises a host computer 102 which connects to one or more instruments. The host computer 102 comprises a CPU, a display screen, memory, and one or more input devices such as a mouse or keyboard as shown. The computer 102 may connect through the one or more instruments to analyze, measure, or control a unit under test (UUT) or process 150. The host computer 102 may store the first client computer program and the second client computer program. The data stored by the first client computer program and retrieved by the second client computer program may be acquired from the one or more instruments. In other words, the computer 102 may be either of computers 82 or 86.

The one or more instruments may include a GPIB instrument 112 and associated GPIB interface card 122, a data acquisition (DAQ) board 114 and associated signal conditioning circuitry 124, a VXI/VME chassis or instrument 116, a PXI chassis or instrument 118, a video device 132 and associated image acquisition card 134, a motion control device 136 and associated motion control interface card 138, and/or one or more computer based instrument cards 142, among other types of devices.

The GPIB instrument 112 is coupled to the computer 102 via the GPIB interface card 122 provided by the computer 102. In a similar manner, the video device 132 is coupled to the computer 102 via the image acquisition card 134, and the motion control device 136 is coupled to the computer 102 through the motion control interface card 138. The data acquisition board 114 is coupled to the computer 102, and may interface through signal conditioning circuitry 124 to the UUT. The signal conditioning circuitry 124 preferably comprises a SCXI (Signal Conditioning eXtensions for Instrumentation) chassis comprising one or more SCXI modules 126.

The GPIB interface card 122, the image acquisition card 134, the motion control interface card 138, and the DAQ card 114 are typically plugged in to an I/O slot in the computer 102, such as a PCI bus slot, a PC Card slot, or an ISA, EISA or MicroChannel bus slot provided by the computer 102. However, these cards 122, 134, 138 and 114 are shown external to computer 102 for illustrative purposes.

The VXI/VME chassis or instrument 116 is coupled to the computer 102 via a VXI bus, MXI bus, or other serial or parallel bus provided by the computer 102. The computer 102 preferably includes VXI interface logic, such as a VXI, MXI or GPIB interface card (not shown), which interfaces to the VXI chassis 116. The PXI chassis or instrument 118 is preferably coupled to the computer 102 through the computer's PCI bus.

A serial instrument (not shown) may also be coupled to the computer 102 through a serial port, such as an RS-232 port, USB (Universal Serial bus) or IEEE 1394 or 1394.2 bus, provided by the computer 102. In typical instrumentation control systems an instrument will not be present of each interface type, and in fact many systems may only have one or more instruments of a single interface type, such as only GPIB instruments.

The instruments are coupled to the unit under test (UUT) or process 150, or are coupled to receive field signals, typically generated by transducers. The system 100 may be used in a data acquisition and control application, in a test and measurement application, a process control application, or a man-machine interface application.

FIG. 2B illustrates an exemplary industrial automation system 160. The industrial automation system 160 is similar to the instrumentation or test and measurement system 100 shown in FIG. 2A. Elements which are similar or identical to elements in FIG. 2A have the same reference numerals for convenience. The system 160 may comprise a computer 102 which connects to one or more devices or instruments. The computer 102 comprises a CPU, a display screen, memory, and one or more input devices such as a mouse or keyboard as shown. The computer 102 connects through the one or more devices to a process or device 150 to perform an automation function, such as MMI (Man Machine Interface), SCADA (Supervisory Control and Data Acquisition), portable or distributed data acquisition, process control, advanced analysis, or other control. In FIG. 2B, the computer 102 may store the first client computer program and the second client computer program. The data stored by the first client computer program and retrieved by the second client computer program may be acquired from the automation system 160. In other words, the computer 102 maybe either of computers 82 or 86.

The one or more devices may include a data acquisition (DAQ) board 114 and associated signal conditioning circuitry 124, a PXI chassis or instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system 186 available from National Instruments, among other types of devices.

The DAQ card 114, the PXI chassis 118, and the image acquisition card 134 are preferably connected to the computer 102 as described above. The serial instrument 182 is coupled to the computer 102 through a serial interface card 184, or through a serial port, such as an RS-232 port, provided by the computer 102. The PLC 176 couples to the computer 102 through a serial port, Ethernet port, or a proprietary interface. The fieldbus interface card 172 is preferably comprised in the computer 102 and interfaces through a fieldbus network to one or more fieldbus devices. Each of the DAQ card 114, the serial card 184, the fieldbus card 172, the image acquisition card 134, and the motion control card 138 are typically plugged in to an I/O slot in the computer 102 as described above. However, these cards 114, 184, 172, 134, and 138 are shown external to computer 102 for illustrative purposes. In typical industrial automation systems a device will not be present of each interface type, and in fact many systems may only have one or more devices of a single interface type, such as only PLCs. The devices are coupled to the device or process 150.

Referring again to FIGS. 2A and 2B, the computer system 102 preferably includes a memory medium on which one or more computer programs or software components according to the present invention are stored. The term "memory medium" is intended to include an installation medium, e.g., a CD-ROM, floppy disks 104, or tape device; a computer system memory or random access memory such as DRAM, SRAM, EDO RAM, Rambus RAM, etc.; or a non-volatile memory such as a magnetic media, e.g., a hard drive, or optical storage. The memory medium may comprise other types of memory as well, or combinations thereof.

In addition, the memory medium may be located in a first computer in which the programs are executed, or may be located in a second different computer which connects to the first computer over a network, such as the Internet. In the latter instance, the second computer provides the program instructions to the first computer for execution. Also, the computer system 102 may take various forms, including a personal computer system, mainframe computer system, workstation, network appliance, Internet appliance, personal digital assistant (PDA), television system or other device. In general, the term "computer system" can be broadly defined to encompass any device having at least one processor which executes instructions from a memory medium.

In one embodiment, the first client computer program and the second client computer program are designed for data acquisition/generation, analysis and/or display. For example, in one embodiment, the first client computer program is the National Instruments LabVIEW graphical programming environment application, which provides specialized support for developers of instrumentation and industrial automation applications. An example of the second client computer program is the Historical Viewer in Measurement & Automation Explorer (MAX), a National Instruments product.

However, it is noted that the present invention can be used for a plethora of applications and is not limited to instrumentation or industrial automation applications. In other words, FIGS. 2A and 2B are exemplary only, and data acquisition and/or data retrieval programs for any of various types of purposes may be used, where the programs are stored in and execute on any of various types of systems.

Figure 3:
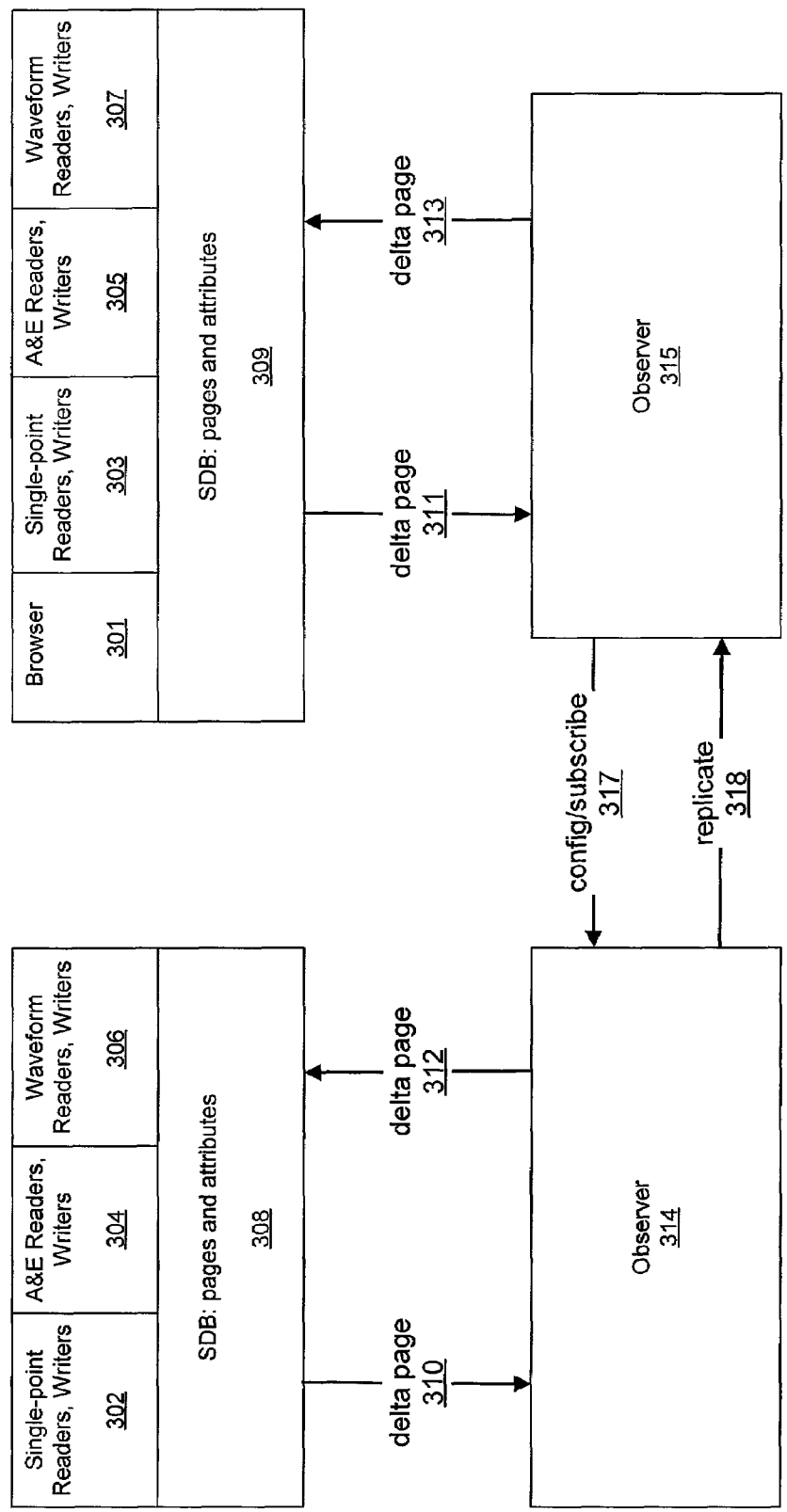
FIG. 3 is a block diagram illustrating an overall architecture of a shared memory architecture for high speed logging and trending, according to one embodiment.

FIG. 3: Overall Architecture

FIG. 3 illustrates one embodiment of a block diagram illustrating an overall architecture of a shared memory architecture for high speed logging and trending.

As used herein, logging refers to writing data and trending refers to reading and displaying data. As used herein, "alarm and event (A & E) data" are types of data that a subsystem, e.g., an alarm subsystem, stores (e.g., events, alarm-set events, alarm-reset events, alarm acknowledgement events).

As used herein, "alarm data" may be a stream of occurrences where each occurrence may be one of three types: set, clear, or acknowledge. Set occurrences may include: a name, a timestamp, a priority, a user (i.e., name of the person logged in when the alarm occurred), an area (i.e., name that may be used to organize alarms into groups), and a description. Clear occurrences may include: a name, a timestamp, and a user (i.e., name of the person who was logged in when the alarm cleared). Acknowledge occurrences may include: a name, a timestamp, a user (i.e., name of the person acknowledging the alarm), and a comment (e.g., a string describing why the alarm occurred and how it was dealt with). As used herein, "event data" may be a stream of event occurrences where each event occurrence may include: a name, a timestamp, a user (i.e., name of the person logged in when the event occurred), and a description.

As used herein, "attribute data" may include a set of attributes or name-value pairs associated with each trace in a streaming database (SDB). As used herein, "process data" is a type of data for which values change slowly. When a value change that is more than a user-specified threshold is detected, the changed value and a timestamp are logged. As used herein, "single-point data" is a type of data that is acquired asynchronously from one or more input channels and logged as a stream of value-timestamp pairs. As used herein, "waveform data" is acquired synchronously and stored using an initial timestamp and which may include a time interval representing the time between successive points.

As used herein, an "observer" is a component that keeps streaming databases (SDBs) on different computers synchronized with each other. As used herein, a "reader" is a software program or object, e.g., a filter object, for reading data of various types. As used herein, a "writer" is a software program or object, e.g., a filter object, for writing data of various types. As used herein, a "streaming database" (SDB) is a component that stores sub-traces or streams of data, or arrays of bytes, into sequences of a certain page size, such as 4 KB pages, in a shared memory or on a disk. The pages of changes may be referred to as delta pages. As used herein, a "delta page" is a structure that represents the difference between the current state of a page in a client's cache and the current state of the page in the server's database. As used herein, a "delta page protocol" may involve computing delta pages at a server and sending them to a client so that the client may update its cache to mirror the data at the server.

As shown in FIG. 3, single-point writers 302 and 303 may be used to log value-timestamp pairs. Similarly, single-point readers 302 and 303 may be used to display previously logged data.

Alarm and event (A&E) writers 304 and 305 may be used to log events (e.g., alarm set events, reset events, acknowledge events). A&E readers 304 and 305 may be used to determine when an alarm has been acknowledged. A&E readers 304 and 305 may also be used to read events, to be stored in a database (e.g., a relational database).

Waveform writers 306 and 307 may be used to write high-speed data (e.g., up to millions of samples per second, or at a rate of up to 250 kHz). Waveform readers 306 and 307 may be used to retrieve and display data.

As used herein, a "shared memory template" is a data structure, such as a C++ construct. A "shared memory template" may be functionally similar to the map template in the C++ standard template library. Shared memory templates may store data such that the data may be safely shared among multiple processes. A browser 301 may expose shared memory templates for users to enable browsing of data in both a local SDB 309 and remote SDBs (e.g., SDB 308). A user may build upon the shared memory templates exposed by the browser 301 to allow multiple types of data to be browsed. The shared memory templates may allow the type of data to browse to be user configurable.

A streaming database (SDB) 308 or 309 may be a shared-memory database including sub-traces (e.g., collections of 4 KB pages or delta pages) and associated attributes of the sub-traces. From an SDB's perspective, the previously mentioned writers and readers (e.g., 302 through 307) deal with delta pages.

Observers 314 or 315 may be responsible for remote browsing, replication, configuration and/or subscribing, and networking. An observer, may read a delta page and modified attributes from a source SDB, and may subsequently send the delta page to a client observer. For example, observer 314 may read a delta page 310 and modified attributes from a source SDB 308 and may subsequently send or replicate 318 the delta page to a client observer 315. Similarly, observer 315 may read a delta page 311 and modified attributes from a source SDB 309 and may subsequently configure or subscribe 317 the delta page to a client observer 314. The client observer may write delta pages and modified attributes to a local SDB. Thus, observer 314 may write delta pages 312 to SDB 308 and observer 315 may write delta pages 313 to SDB 309.

Figure 4:
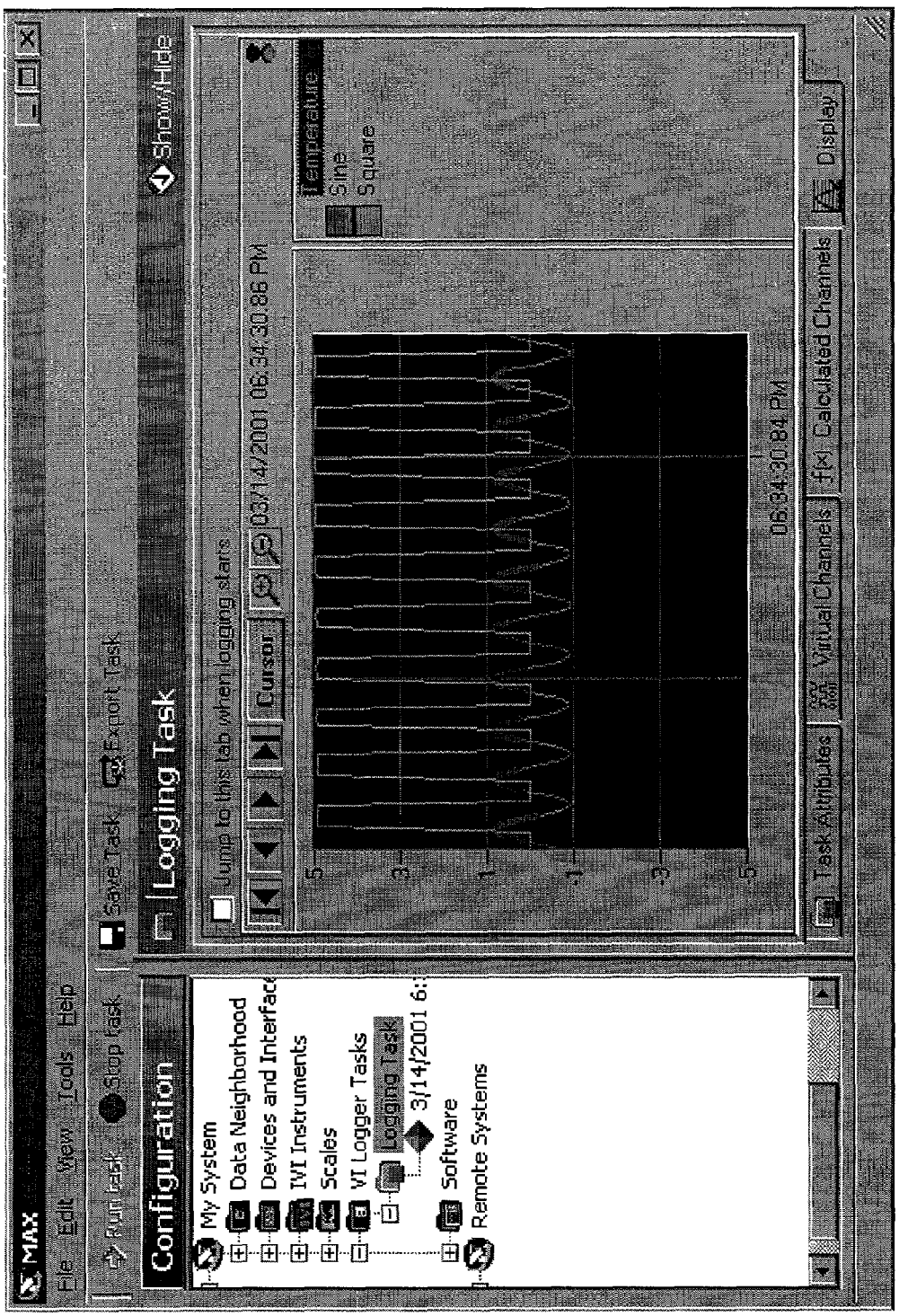
FIG. 4 is a screen shot of high speed trending, according to one embodiment.

FIG. 4: Screen Shot of High Speed Trending

One embodiment of a trender application program (i.e., the Historical Viewer in Measurement & Automation Explorer (MAX), a National Instruments product) is shown in FIG. 4. The MAX program may be configured to repeatedly read data from a stored location (e.g., a shared memory location) and subsequently display the data on a display device. Later data may be continuously logged to the storage location at the same time that earlier data is displayed to the user.

As shown in FIG. 4, a logging task is displayed. Acquisition of data may be user configured to start in response to an analog trigger or a digital trigger. Additional user configurable options may include: (1) start and stop data acquisition at user specified times; (2) publish acquired data to a data socket; (3) define and log virtual channels; (4) define and log calculated channels; (4) define and log events (e.g., high, low, outside range, inside range); (5) display data (e.g., in real time or historical data) in a HyperTrend, among others. In one embodiment, the HyperTrend is a user-interface component developed by National Instruments and available with its LabVIEW DSC, Lookout, and VI Logger products. The HyperTrend may support the viewing of both current and historical data retrieved from a database. The HyperTrend may allow the user to perform multiple tasks, such as browsing for data, displaying data in a chart, and submitting queries for breaks, minima, and maxima in a stream of data that has been logged to a database, among others.

Figure 5:
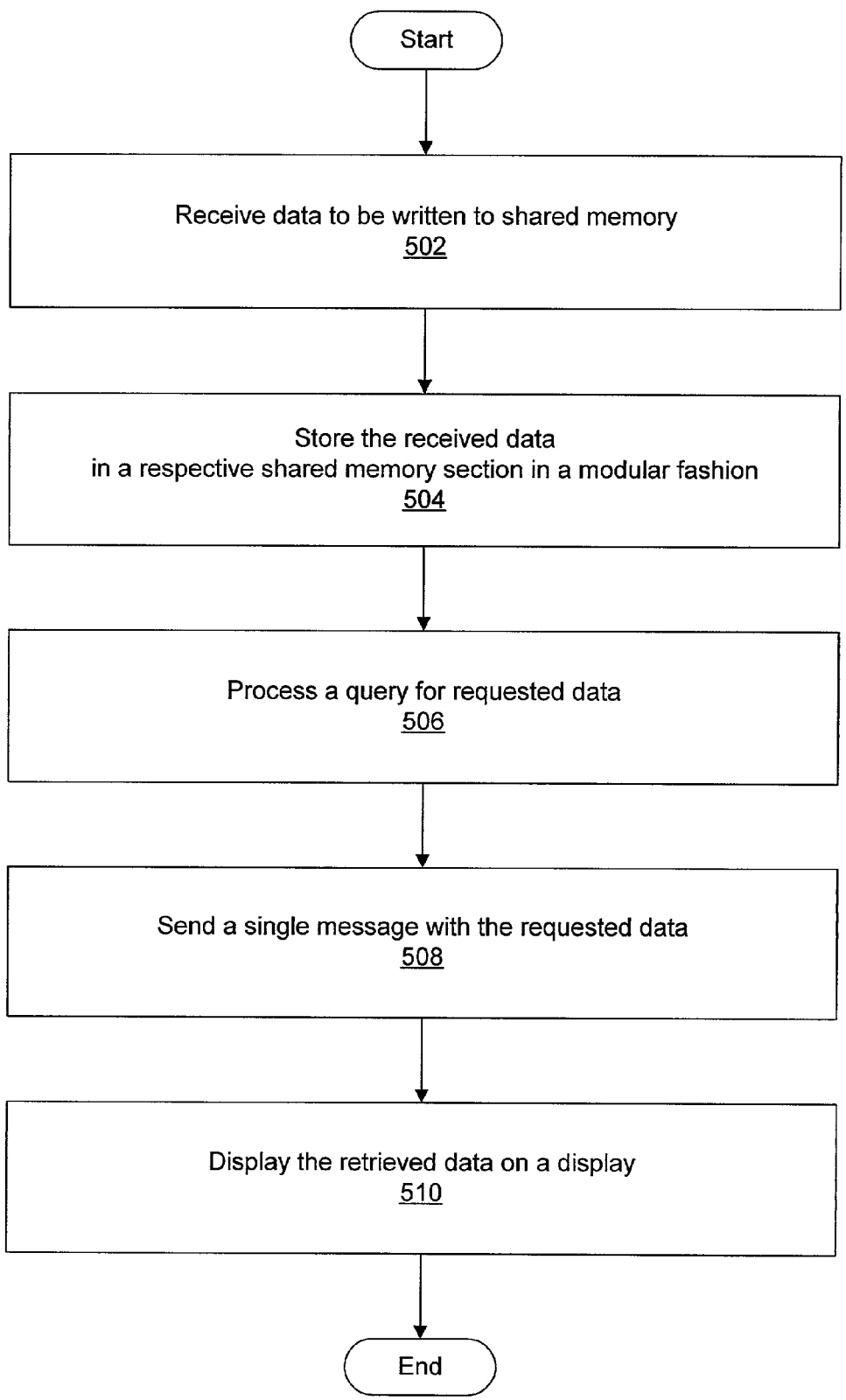
FIG. 5 is a flowchart illustrating a system and method for a delta page protocol for caching, replication, and client/server networking, according to one embodiment.

FIG. 5: Delta Page Protocol

FIG. 5 is a flowchart illustrating a system and method for a delta page protocol for caching, replication, and client/server networking, according to one embodiment.

In step 502, data, such as measurement data, may be received or logged by a logger application. The logger application may execute on a first computer system. The received data may be live data acquired from a data acquisition device. The format of the received data may vary (e.g., waveform data, single-point data, alarm data, event data). The received data may be measurement data acquired from a measurement device. The received data may also be a stream of data comprising a first plurality of entries or data values. The received data may be received for a user specified time interval.

In step 504, the logger application may store or write the received data or portions of the received data in respective shared memory sections of a memory in the first computer system in a modular fashion at a first data rate or during a first time period. Typically, the shared memory sections are stored in a volatile memory. Storing the received data in a modular fashion may include creating a header record comprising a series of bits, wherein the bits in the header record indicate a changed status of the respective shared memory sections. The logger application may then store or write the header record in the shared memory.

The logger application may store or write second and subsequent pluralities of received data values to second and subsequent shared memory sections in the first computer system during second and subsequent time periods. The first, second and subsequent pluralities of data values may affect only what is written to their respective first, second and subsequent shared memory sections.

Each of the portions of the plurality of data values in each of the respective shared memory sections may be independently accessible by a trender application executing in a second computer system. A single network message may be used to transmit multiple shared memory sections. Also, each of the portions of the plurality of data values in each of the respective shared memory sections may independently and accurately represent a subset of the measurement stream.

In step 506, a trender application may generate a query for the plurality of data values or for a first portion or subset of the plurality of data values at a second data rate. The second data rate may be less than the first data rate. The generated query may be sent to the first computer system.

In step 508, in response to the query generated in step 506, the first computer system may send a single message to the second computer system. The single message may be a single network message. The single message may include the plurality of data values or the first portion of the plurality of data values, depending upon the details of the query request. The single message may be referred to as a delta page. The trender application may receive the single message comprising the first portion of the plurality of data values. The trender application may be operable to partially replicate the plurality of data values comprising the measurement stream.

The sending of the single message may include a first observer software program executing on the first computer system querying the memory for a portion, such as a most recent portion, of data at the second data rate, and the first observer software program sending the portion of data to the second computer system at the second data rate after said querying the memory. The first observer software program may retrieve at least a subset of the measurement data and the header record from the shared memory location. The first observer software program may use the bits in the header record to determine the changed status of data sections in the measurement data. In one embodiment where multiple header records exist, retrieved measurement data may be associated with a single header record, or with multiple header records.

For example, each bit in a header record may be designated as "changed" for those sections of stored measurement data which comprise any change in the measurement data from previously stored measurement data from a same measurement device. Conversely, each bit in the header record may be designated as "not changed" for those sections of stored measurement data which comprise no change in the measurement data from previously stored measurement data from a same measurement device.

The receiving of the single message by the trender application may include a second observer software program on the second computer system receiving a portion, such as the most recent portion, of data at the second data rate from the first observer software program, and the second observer software program writing the portion of data to a memory location. In one embodiment, the memory location may be a database. The second observer software program may perform a single write operation to store the data values in a memory of the second computer system. The single write operation may update a local cache in a memory of the second computer system. After the single write operation, the trender application may read the first plurality of data values from the memory of the second computer system.

In step 510, the trender application may present the retrieved data or requested data on a display. The retrieve data may include the first portion of the plurality of data values. The rate at which the retrieved data is displayed may be user configurable. For example, the retrieved data may be displayed at the same rate at which the data is provided, or at some alternate, user specified rate. In one embodiment, the logging and trending may be performed substantially concurrently.

In one embodiment, first measurement data of a first data type of a plurality of data types may be received from a first measurement device of a plurality of measurement devices. Additionally, second and subsequent measurement data of second and subsequent data types of a plurality of data types may be received from second and subsequent measurement devices of a plurality of measurement devices. There may be data types in common among the first, second, and subsequent measurement data. Similarly, there may be measurement devices in common among the first, second, and subsequent measurement devices. A second header record may be created when the first header record reaches a user specified number of bits, and subsequent header records may be created when the second header record reaches the user specified number of bits.

Although the system and method of the present invention have been described in connection with several embodiments, the invention is not intended to be limited to the specific forms set forth herein, but on the contrary, it is intended to cover such alternatives, modifications, and equivalents, as can be reasonably included within the spirit and scope of the invention as defined by the appended claims.

What is claimed is:

1. A method of logging and trending real time measurement data, the method comprising:

a logger application executing on a first computer system receiving a measurement stream comprising a plurality of real time measurement data values, wherein the plurality of real time measurement data values are acquired from a physical system by a measurement device;

the logger application writing portions of the plurality of real time measurement data values to respective shared memory sections of a memory in the first computer system in a modular fashion;

wherein each of the portions of the plurality of real time measurement data values in each of the respective shared memory sections is independently accessible by a trender application executing in a second computer system;

initiating the trender application on the second computer system;

the trender application generating a query request for a first portion of the plurality of real time measurement data values;

the first computer system sending a single message to the second computer system, wherein the single message comprises the first portion of the plurality of real time measurement data values, wherein the first portion comprises two or more of the real time measurement data values;

the trender application receiving the single message comprising the first portion of the plurality of real time measurement data values;

the trender application displaying the first portion of the plurality of real time measurement data values.

2. The method of claim 1, wherein each of the portions of the plurality of real time measurement data values in each of the respective shared memory sections is independently accessible by a trender application executing in a second computer system using a single network message.

3. The method of claim 1, wherein each of the portions of the plurality of real time measurement data values in each of the respective shared memory sections independently and accurately represents a subset of the measurement stream.

4. The method of claim 1, wherein the single message is a delta page.

5. The method of claim 1, wherein the logger application receives the measurement stream and writes the portions of the plurality of real time measurement data values to respective shared memory sections of the memory at a first data rate;

wherein the trender application generates the query request for the first portion of the plurality of real time measurement data values at a second data rate, wherein the second data rate is less than the first data rate.

6. The method of claim 5, wherein the first computer system sending a single message to the second computer system comprises:

a first observer software program executing on the first computer system querying the memory for a most recent portion of data at the second data rate; and the first observer software program sending the most recent portion of data to the second computer system at the second data rate after said querying the memory;

wherein the trender application receiving the single message comprises:

a second observer software program on the second computer system receiving the most recent portion of data at the second data rate from the first observer software program; and the second observer software program writing the most recent portion of data to a memory location.

7. The method of claim 6, wherein the memory location is a database.

8. The method of claim 1, wherein the trender application is operable to partially replicate the plurality of real time measurement data values comprising the measurement stream.

9. The method of claim 1, wherein the logger application writing portions of the plurality of real time measurement data values to respective shared memory sections of a memory in the first computer system in a modular fashion comprises:

creating a header record comprising a series of bits, wherein the bits in the header record indicate a changed status of the respective shared memory sections;

the logger application writing the header record in the shared memory.

* * * * *